CIRCUIT ARRANGEMENT FOR CONTROLLING SWITCHING MATRICES

Filed March 22, 1961 5 Sheets-Sheet 1

INVENTORS
ANTONIE W. VAN'T SLOT.
WILLEM SMIT.
BY
AGENT

INVENTORS
ANTONIE W. VAN 'T SLOT.
WILLEM SMIT.
BY
AGENT $C_1$: 19'', 29', 29'', 19'

$C_2$: 29'', 19', 19'', 29'

C : 29', 29'', 19', 19''

| | | $F_1'$ | $F_1''$ | $F_2'$ | $F_2''$ |
|---|---|---|---|---|---|
| I | $t_1$ | | $C_1$ | | |
| | $t_3$ | | | | $C_2$ |
| | $t_5$ | | | $C_3$ | |
| II | $t_1$ | | | $C_1$ | |
| | $t_3$ | $C_2$ | | | |
| | $t_5$ | | | | $C_3$ |
| III | $t_1$ | | | | $C_1$ |
| | $t_3$ | | $C_2$ | | |
| | $t_5$ | $C_3$ | | | |
| IV | $t_1$ | $C_1$ | | | |
| | $t_3$ | | | $C_2$ | |
| | $t_5$ | | $C_3$ | | |

INVENTOR
ANTONIE W. VAN 'T SLOT.
WILLEM SMIT.
BY
Frank R. Jerfani
AGENT

INVENTOR
ANTONIE W. VAN'T SLOT.
WILLEM SMIT.
BY Frank R. Jifari
AGENT

INVENTOR
ANTONIE W. VAN'T SLOT.
WILLEM SMIT.
BY
AGENT

United States Patent Office 3,268,866
Patented August 23, 1966

3,268,866

CIRCUIT ARRANGEMENT FOR CONTROLLING SWITCHING MATRICES

Antonie Wijbe van 't Slot and Willem Smit, Hilversum, Netherlands, assignors to North American Philips Company, Inc., New York, N.Y., a corporation of Delaware Filed Mar. 22, 1961, Ser. No. 97,497
Claims priority, application Netherlands, Apr. 22, 1960, 250,800
8 Claims. (Cl. 340—147)

This invention relates to circuit arrangements for controlling switching matrices. Such matrices typically have several inlets and outlets, each inlet being connected to an information source and each outlet being connected to an information receiver. Such circuit arrangements may be used inter alia in telegraph systems, for example booking systems for airway companies, or telegraph systems included in the air-defense system of a country. In either case, centrally-arranged information handling equipment comprising a plurality of inlets is supplied by a switching network from a plurality of telegraph lines. Hereinafter it is assumed that the information is coded in binary form, but this is not essential. The telegraph lines or the buffer memories connected thereto fulfill the function of information sources and the inlets of the information-handling equipment fulfill the function of information receivers. These words must therefore be interpreted broadly, namely in the sense that all that delivers information is an information source and all that receives or transfers away information is an information receiver. In accordance with the invention, each information source has at least two control signal outlets and one control signal inlet and delivers a control signal indicating whether the information source has or has not information intended for transmission, or whether the information source has transmitted a complete amount of information (telegram) a control signal indicating that the relevant information source may start to transmit the information stored therein may be received at the control signal inlet. Each information receiver comprises at least as many control signal outlets as there are information sources for delivering control signals indicating whether the relevant information receiver is free or busy, which control signals are delivered in cyclic order by the control signal outlets of an information receiver at those moments of the pulse cycles which are characteristic of the relevant information receiver and which are different for the various information receiver. Each information receiver also has a control signal inlet for receiving a control signal busying the relevant information receiver. Each information source has associated with it a control circuit having at least three control signal inlets, two of which are individually connected to the control signal outlets of the relevant information source and the third of which is multipled to control signal outlets of the information receivers. The control circuit has $2n+1$ control signal outlets, of which $n$ outlets are individually connected to the control terminals of the gates, thereby giving the relevant information source access to the information receivers, and of which $n$ further outlets are connected to control signal inlets of the information receivers. The $(2n+1)^{st}$ control signal outlet is connected to the control signal inlet of the relevant information source, each control circuit being designed so that the reception of the control signal indicating that the relevant information source contains information intended for transmission renders the control circuit sensitive to handling the control signals indicating that an information receiver is free. In the sensitive state the reception of a control signal indicating that a given information receiver is free causes the transmission of a plurality of signals. The first signal opens a gate, thereby connecting the relevant information source to the free information receiver. The second is a control signal which makes the relevant information receiver busy, and the third a further control signal which allows the relevant information source to transmit information stored therein. The control circuit has become insensitive for handling further control signals emanating from the information receivers, the identity of the information receiver giving the control signal "free" being derived from the moment of the pulse cycles at which the relevant signal is received, and the control circuit becoming insensitive before it can receive from another information receiver a control signal indicating that it is free. The reception of the control signal indicating that the relevant information source has transmitted a complete amount of information (telegram) results in the interrupting of the control signal which keeps open a gate of the switching matrix, the control member remaining insensitive for handling control signals delivered by the information receivers.

In order that the invention may be readily carried into effect, two embodiments thereof will now be described in detail, by way of example, with reference to the accompanying diagrammatic drawings, in which.

The example described hereinafter relates to a case where the information receivers are inlets of a central information-handling equipment, for example a large electronic computer, and where the information sources are buffer memories fed from telegraph lines leading to this central equipment. Such buffer memories are required if an inlet of the central equipment, after reception of a complete amount of information (hereinafter referred to as a telegram), remains cut off for the reception of new information during a certain period, because the central equipment needs some time for handling the information received through the said inlet. If the central equipment needs no extra time for handling the information led thereto, such buffer memories are not required and the inlets of the switching matrix may be connected directly to the telegraph lines leading to the central equipment.

Figure 1:
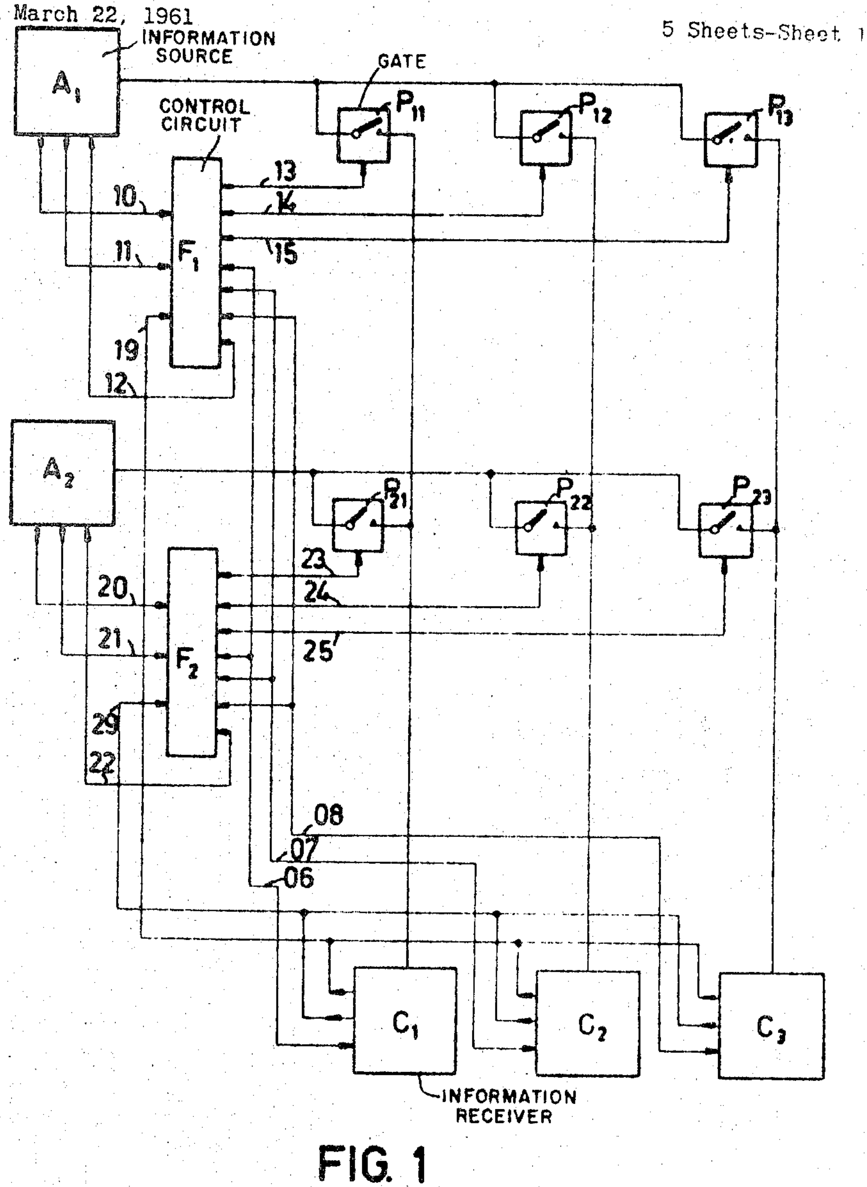
FIGURE 1 shows a block diagram of a first embodiment of the invention.

FIGURE 1 shows a first embodiment of the invention, comprising two information sources $A_1$ and $A_2$ and three information receivers $C_1$, $C_2$, $C_3$. The information source $A_i$ is connected through a gate $P_{ij}$ to the information receiver $C_j$ ($i=1,2$; $j=1,2,3$). Gates $P_{11}$, $P_{12}$, $P_{13}$ and $P_{21}$, $P_{22}$, $P_{23}$ are controlled by control circuits $F_1$ and $F_2$ respectively. An object of the invention is to control the gates $P_{ij}$ so that, if an information source contains information intended for transmission, this information source is connected as rapidly as possible to a free information receiver, it being immaterial, however, to which free information receiver the information source is connected. It is necessary therefor that each information source can deliver a control signal indicating that it contains information intended for transmission. This control signal is led by the information source $A_1$ through a wire 10 to the control circuit $F_1$ and by the information source $A_2$ through a wire 20 to the control circuit $F_2$. Each information source is designed so as to deliver another control signal if it has just transmitted a complete amount of information (hereinafter referred to as a telegram).

This other control signal is led by the information source $A_1$ through a wire 11 to the control circuit $F_1$ and by the information source $A_2$ through a wire 21 to the control circuit $F_2$. The information sources are furthermore designed so as to respond to the reception of a certain control signal by transmitting the information stored therein. The information source $A_1$ receives the latter control signal through a wire 12 from the control circuit $F_1$, while the information source $A_2$ receives through a wire 22 from the control circuit $F_2$. The information receivers are designed so as to deliver a signal in the free state. The control circuit $F_1$ receives this control signal through a wire 19 in time-multiplex from the information receivers $C_1$, $C_2$, $C_3$, while the control circuit $F_2$ receives through a wire 29. The information receivers are furthermore designed so as to be busied by the reception of a control signal. The information receiver $C_1$ receives this control signal through a wire 06 from the control circuit $F_1$ or $F_2$, the information receiver $C_2$ through a wire 07 and the information receiver $C_3$ through a wire 08. The control member $F_1$ can produce signals which open the gates $P_{11}$, $P_{12}$, $P_{13}$ and the control member $F_2$ can produce signals which open the gates $P_{21}$, $P_{22}$, $P_{23}$. These signals are supplied through wires 13, 14, 15 and 23, 24, 25, respectively, to the control terminals of the gates $P_{11}$, $P_{12}$, $P_{13}$ and $P_{21}$, $P_{22}$, $P_{23}$ respectively.

In the circuit shown in FIGURE 1, it is assumed that the control signal, indicating that the information source $A_1$ contains information intended for transmission, is a pulse series with pulses which occur at the moment $t_7$ of the pulse cycles and which are led through the wire 10 to the control circuit $F_1$. The signal indicating that the information source $A_1$ has just transmitted a telegram is a pulse which occurs once at the moment $t_7$ of a pulse cycle and which is led through the wire 11 to the control circuit $F_1$. The signal produced by the control circuit $F_1$ and allowing the information source $A_1$ to transmit information is a pulse which occurs once at the moment $t_8$ of a pulse cycle and which is led through the wire 12 to the information source $A_1$. The analogous signals relating to the information source $A_2$ are likewise pulses which occur once at the same moments and are led through the wires 20, 21 and 22 to the control member $F_2$ and the information source $A_2$ respectively.

If the information receiver $C_1$ is free, a pulse series is produced therein, the pulses of which occur at the moment $t_1$ of the pulse cycles. Such pulses are alternatively led through a wire 19 to the control circuit $F_1$ and through a wire 29 to the control circuit $F_2$. The information receivers $C_2$ and $C_3$ are designed in an analogous manner, but the relevant pulses now occur at the moments $t_3$ and $t_5$, respectively, of the pulse cycles.

The circuit arrangement operates as follows. Let it be assumed that the information source $A_1$ contains information intended for transmission. The control circuit $F_1$ then receives a pulse through the wire 10 at the moment $t_7$ of a pulse cycle, thus being rendered sensitive to handling the signals incoming through the wire 19. Let it further be assumed that the information receivers $C_2$ and $C_3$ are free at this moment, but the information receiver $C_1$ is busy. The information receivers $C_2$ and $C_3$ then alternatively transmit a control pulse at the moments $t_3$ and $t_5$, respectively, through the wire 19 to the control circuit $F_1$ and through the wire 29 to the control circuit $F_2$. Let it be assumed that the first control pulse received by the control circuit $F_1$ after having been made sensitive is a control pulse at the moment $t_5$. From the fact that the control pulse occurs at the moment $t_5$ of a pulse cycle it follows that it originates from the information receiver $C_3$ and hence the latter is free. The reception of this control pulse at the moment $t_5$ renders the control circuit $F_1$ insensitive to handling further control pulses incoming through the wires 10 and 19 and also results in a signal, in the form of a pulse series with pulses occurring at the moment $t_9$ being transmitted through a wire 15 to the gate $P_{13}$, which is thus opened periodically. A signal in the form of a control pulse is transmitted at the moment $t_8$ through the wire 08 to the information receiver $C_3$ and renders this receiver busy so that it can no longer emit control pulses at the moment $t_5$ of the pulse cycles, and a signal in the form of a control pulse is transmitted at the moment $t_8$ through the wire 12 to the information source $A_1$ and allows this information source to transmit information stored therein. The information consists of pulse code groups, the code elements of which occur at the moments $t_9$ of the pulse cycles. Since the gate $P_{13}$ is open at each of these moments during the duration of a pulse, the information transmitted by the information source $A_1$ is led to the information receiver $C_3$, as desired. After lapse of some time, the control circuit $F_1$ receives from the information source $A_1$ through, a wire 11 the signal in the form of a control pulse at the moment $t_7$ of a pulse cycle, indicating that this information source has just transmitted a complete telegram. The control circuit $F_1$ responds to the reception of this signal by interrupting the pulse series transmitted to the gate $P_{13}$ so that this gate is no longer opened periodically. At the same time, the control circuit $F_1$ again becomes sensitive to handling an incoming signal over the wire 10, indicating that the information source $A_1$ again contains information intended for transmission.

Figure 2:
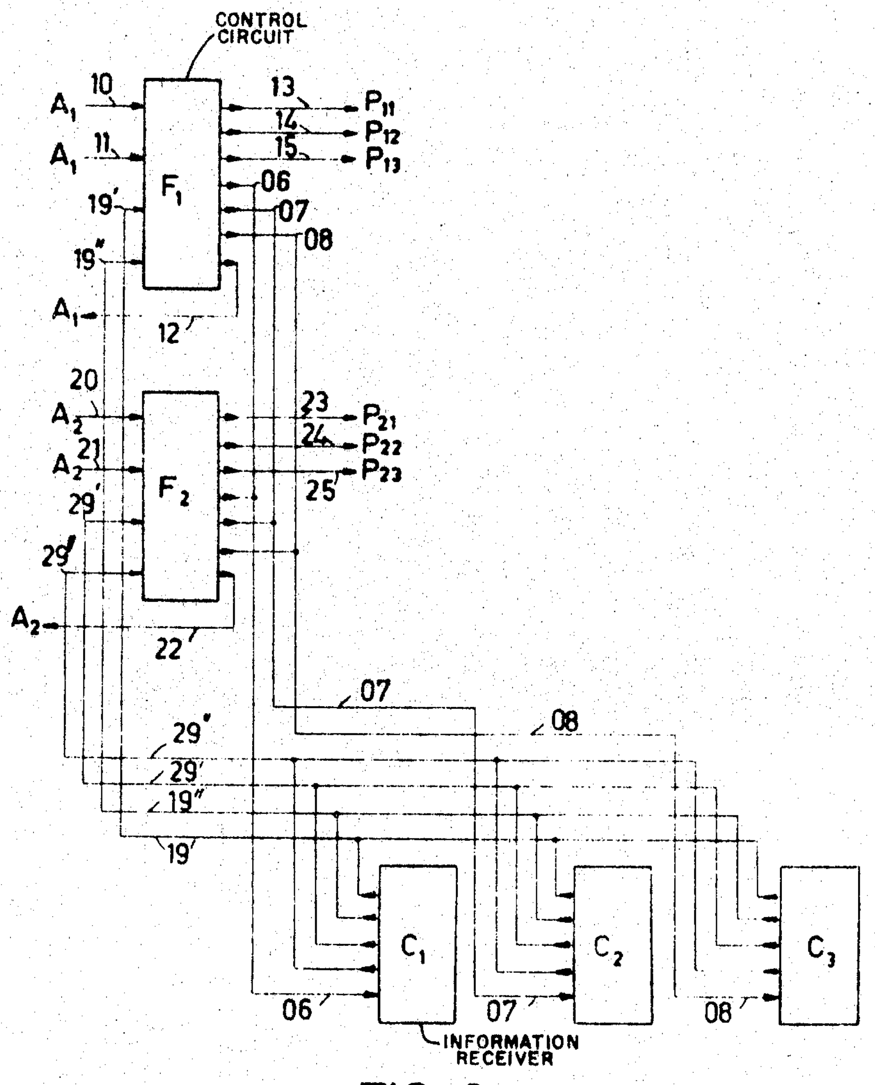
FIGURE 2 shows, also in block form, the control portion of a second embodiment of the invention.
Figures 3, 4:
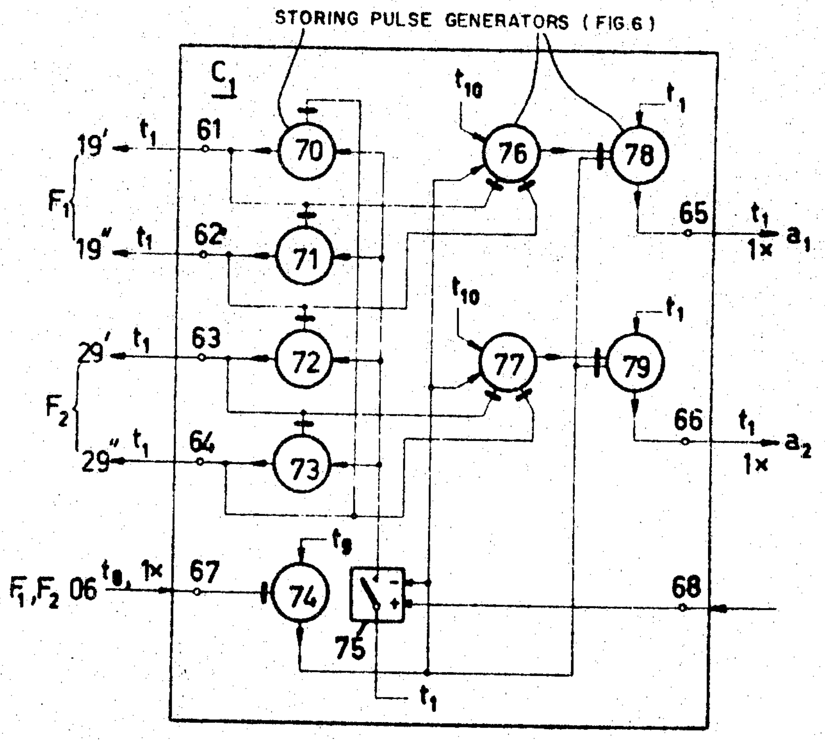
FIGURE 3 shows a diagram which serves to explain the operation of the second embodiment.
FIGURES 4 and 5 show possible embodiments of component parts of the circuit of FIGURE 2.

In the circuit arrangement described hereinbefore, the two information sources $A_1$ and $A_2$, as soon as they have delivered the signal "free" for transmitting information, have the same chance of catching a free information receiver. However, it may be practical to design the arrangement so that one of the two information sources, for example $A_1$, has more chance of immediately catching a free information receiver than the other. This is desirable inter alia if the information source $A_1$ has to transmit much more information than the information source $A_2$, or if the information delivered by the information source $A_1$ is more important than that delivered by the information source $A_2$. FIGURE 2 shows an arrangement in which it may be ensured at will that one of the two information sources $A_1$ and $A_2$ has a twice greater chance of immediately catching a free information receiver than the other, or that the two information sources have the same chance of catching a free information receiver. For the sake of simplicity, FIGURE 2 shows only the control portion of the circuit. It differs from the circuit shown in FIGURE 1 in that the control circuit $F_1$ can now receive through two wires 19' and 19'' signals from the information receivers $C_1$, $C_2$, $C_3$, which indicate that the information receivers are free, while the control circuit $F_2$ can also receive signals from these information receivers through two wires 29', 29''. Consequently, each of the three information receivers require four signal outlets. In FIGURE 4, which relates more particularly to the information receiver $C_1$, these are the outlets indicated by 61, 62, 63, 64. Each information receiver is designed so that a control pulse is led to one of the four signal outlets in a cyclic sequence during each pulse cycle at the moment which is characteristic of the relevant information receiver. The transmission of these control pulses is stopped when the information receiver receives through, the wire 06, 07, or 08 a control pulse making it busy, but begins again if it becomes free again. The latter may be detected in known manner by the fact that no more information is supplied to the information receiver, or by the fact that each telegram terminates with a special code group, which means that a telegram is completed. When an information receiver again starts to emit control pulses, it begins with the signal outlet which, in the cyclic sequence, follows the signal outlet having transmitted the last control pulse that was transmitted. Let it now be assumed that the information receivers $C_1$, $C_2$, $C_3$ transmit pulses at the moments $t_1$, $t_3$, $t_5$ of each pulse cycle to their signal outlets connected to the wires 19'', 29'', 29' (FIGURE 3). It is supposed that for the information receiver C1 this is the signal outlet 62 (FIGURE 4), so that this information receiver transmits pulses successively to the signal outlets 62, 63, 64, 61, 62, 63, . . ., which pulses occur in each case at the moment $t_1$ of a pulse cycle. Something analogous applies to the information receivers $C_2$ and $C_3$.

If the control circuits $F_1$ and $F_2$ respond to pulses received through the wires 19', 19'', 29', 29'' and if the signal receivers $C_2$ and $C_3$ are free, the control circuits receive signals from these free information receivers in the sequence: $F_2$ (from $C_2$ through 29''), $F_2$ (from $C_3$ through 29'), $F_1$ (from $C_2$ through 19'), $F_2$ (from $C_3$ through 29''), $F_1$ (from $C_2$ through 19''), $F_1$ (from $C_3$ through 19'), $F_2$ (from $C_2$ through 29'), $F_1$ (from $C_3$ through 19''), . . ., (see FIGURE 3). Since $F_1$ and $F_2$ occur equally often in this series (each four times during each period of four control pulse cycles) and the series can start at an arbitrary moment and with an arbitrary relative shift of the pulses (dependent upon the pulse cycle in which a connection is requested), $F_1$ and $F_2$, and hence $A_1$ and $A_2$, have the same chance of catching a free information receiver. If the control circuits $F_1$ and $F_2$ respond only to control pulses received through the wires 19' and 29', the sequence is: $F_2$ (from $C_3$ through 29'), $F_1$ (from $C_2$ through 19'), $F_1$ (from $C_3$ through 19'), $F_2$ (from $C_2$ through 29'), . . ., from which it follows that $F_1$ and $F_2$ now also have the same chance of catching a free information receiver. However, let it now be assumed that the control circuit $F_1$ responds to control pulses received through the wires 19' and 19'', but the control circuit $F_2$ responds only to pulses received through the wire 29'. The sequence is now: $F_2$ (from $C_3$ through 29'), $F_1$ (from $C_2$ through 19'), $F_1$ (from $C_2$ through 19''), $F_1$ (from $C_3$ through 19'), $F_2$ (from $C_2$ through 29'), $F_1$ (from $C_3$ through 19''), . . . $F_1$ occurs in this series twice as often as $F_2$, that is to say the control circuit $F_1$ and hence the information source $A_1$ has a twice greater chance of catching a free information receiver than the control circuit $F_2$ and hence the information source $A_2$.

FIGURE 4 shows a possible circuit of the control portion of the information receiver $C_1$. The information receivers $C_2$ and $C_3$ have similar control circuits. The circuit shown in FIGURE 4 is built up of storing pulse generators, which is to be understood to mean a circuit with a cocking terminal, a setting or firing terminal and an output terminal, which delivers an output pulse only if a pulse of a given polarity and sufficient strength is first led to the setting or cocking terminal (cocking the pulse generator) and subsequently a pulse of a given polarity and sufficient strength is led to the firing terminal (firing the pulse generator). Cocking a storing pulse generator which has already been cocked has no effect and neither has firing a storing pulse generator which has already been fired and then not cocked again. In the figure, the cocking terminal is indicated by a transverse dash through the line leading to this terminal, the firing terminal by an arrow directed towards the circle representing the storing pulse generator, and the output teminal by an arrow directed away from this circle.

The circuit shown in FIGURE 4 has six outlets 61, 62, 63, 64, 65, 66 and two inlets 67 and 68. The outlets 61, 62, 63, 64 are connected to the output terminals of four storing pulse generators 70, 71, 72, 73, which are circuited in the form of a ring and fired through a gate 75 by pulses which occur at the moments $t_1$ of the pulse cycles. The outlets 65 and 66 are connected to the output terminals of two storing pulse generators 78 and 79, first cocking terminals of which are connected to output terminals of two further storing pulse generators 76 and 77, and second cocking terminals of which are jointly connected to the firing terminal of a storing pulse generator 74. The latter output terminal is also connected to a firing terminal of each of the pulse generators 76 and 77 and to a control terminal of the gate 75. The inlet 67 is connected to a cocking terminal of a storing pulse generator 74 and the inlet 68 is connected to a second control terminal of the gate 75. The circuit can otherwise be seen from FIGURE 4, the storing pulse generators being fired at the moments indicated in this figure.

The circuit arrangement operates as follows. As soon as a telegram has completely passed through the information receiver $C_1$, a pulse is led in a known manner, which is irrelevant to the invention, to the inlet 68, which pulse opens the gate 75. This gate may be, for example, a polar relay which is circulated so as to be energized by a pulse. Consequently, the ring 70, 71, 72, 73 is fed with pulses which occur at the moments $t_1$ of the pulse cycles. One of the pulse generators 70, 71, 72, 73, for example the pulse generator 70, is in the cocked state. It is fired at the next-following moment $t_1$ and then delivers a pulse which is led as a control pulse to the outlet 61 and which at the same time cocks the storing pulse generators 71 and 76. At the next moment $t_1$, the pulse generator 71 delivers an output pulse which is led to the outlet 62 and which at the same time cocks the pulse generators 72 and 76, and so forth. The pulse generators 76 and 77 are fired at the moment $t_{10}$ of each pulse cycle so as to be always in the non-cocked state at the beginning of each pulse cycle. For satisfactory operation of the shift register constituted by the ring of pulse generators 70, 71, 72, 73, it is of course necessary for the output pulses of the pulse generators 70, 71, 72, 73 to be of sufficiently longer duration than the firing pulses received through the gate 75 and sufficiently strong. Thus, the information receiver $C_1$ is now in the state in which it transmits control pulses to the control circuits $F_1$ and $F_2$ at the moments $t_1$ of the pulse cycles. When the inlet 67 receives through the wire 06 a control pulse from the control circuit $F_1$ or $F_2$ at the moment $t_8$ of a pulse cycle, the pulse generator 74 is cocked. This pulse generator is fired at the next moment $t_9$ and delivers an output pulse which is used first for closing gate 75, so that the outlets 61, 62, 63, 64 no more deliver control pulses, second for firing the pulse generators 76 and 77, and third for cocking one of the pulse generators 78 and 79 in coincidence with an output pulse delivered by one of the pulse generators 76 and 77. As previously mentioned, the last-mentioned pulse generators are also fired at the moment $t_{10}$ of each pulse cycle, but the output pulses which may thus be delivered at this moment by the pulse generators 76 and 77 cannot cock the pulse generators 78 and 79, since coincidence at their cocking terminals does not take place. Let it now be assumed that the control pulse is received across the inlet 67 at the moment $t_8$ and occurs after the pulse generator 72 has been fired last and hence the pulse generators 73 and 77 are in the cocked state. Since the gate 75 is closed, none of the pulse generators 70, 71, 72, 73 may now be fired. As previously mentioned, the pulse generators 76 and 77 are fired at the next-following moment $t_9$, but this effects only the pulse generator 77. The pulse generator 79 is cocked in coincidence and fired again at the moment $t_1$ of the next pulse cycle so that the outlet 66 delivers a control pulse (signal $a_2$). It can readily be appreciated that the outlet 65 delivers a control pulse (signal $a_1$) when the ring of pulse generators 70 to 73 has stopped after one of the outlets 61 and 62 has been the last to deliver a control pulse, which means that the information receiver $C_1$ has been busied by the information source $A_1$, whereas the outlet 66 delivers a pulse (signal $a_2$) when the ring 70 to 73 has stopped after one of the outlets 63 and 64 has been the last to deliver a pulse, which means that the information receiver $C_1$ has been busied by the information source $A_2$. The possession of this additional information may be important for the control of the system of which the described circuit forms part.

Figure 5:
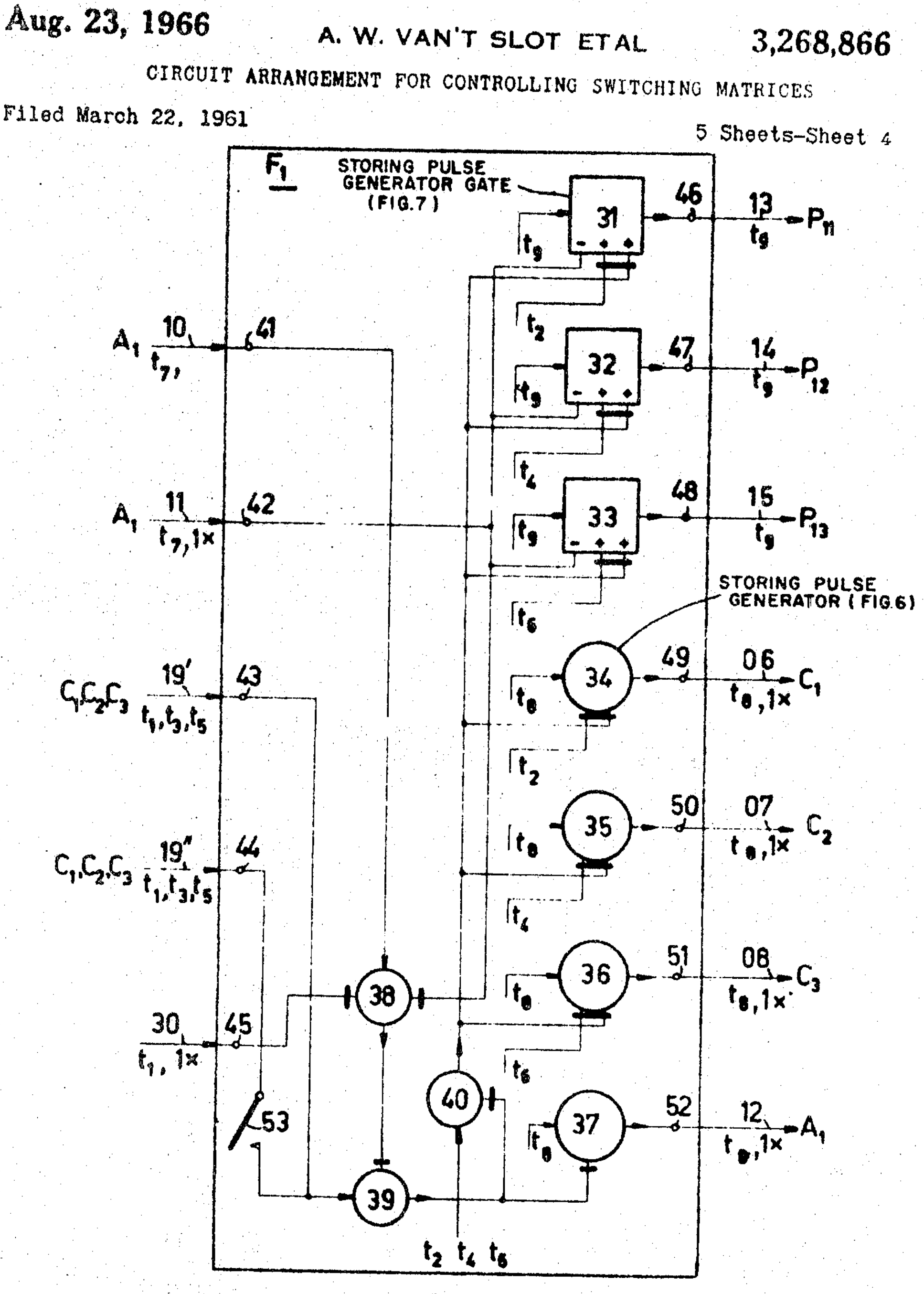

FIGURE 5 shows a possible embodiment of the control circuit $F_1$. The control circuit $F_2$ has an analogous circuit. The circuit comprises five inlets 41, 42, 43, 44, 45 and seven outlets 46, 47, 48, 49, 50, 51, 52, which are connected in the indicated manner to the wires 10, 11, 19', 19'', 30, 13, 14, 15, 06, 07, 08 and 12. The circuit also comprises three gate circuits 31, 32, 33, controlled in coincidence, seven storing generators 34, 35, 36, 37, 38, 39, 40 and a switch 53. The gate circuit 31 is designed so that it is opened only when receiving a pulse at each control terminal, repersented by a transverse dash, at the moment $t_2$ of a pulse cycle and closed when receiving a pulse at the control terminal, indicated by a minus sign, at the moment $t_7$ of a pulse cycle. In its open state the gate 31 passes pulses which occur at the moments $t_9$ of the pulse cycles. The gate circuits 32 and 33 have analogous properties, except that the moment $t_2$ must now be replaced by $t_4$ and $t_6$ respectively. The pulse generators 34, 35, 36 can be cocked only in coincidence. The above-mentioned circuit elements are otherwise circuited in the manner shown in FIGURE 5.

The circuit arrangement operates as follows. Let it be assumed that the circuit is in the state wherein all the gates 31, 32, 33 are closed and the pulse generator 38 only is in the cocked state, while the circuit 53 is closed (so that the circuit responds to control pulses incoming through the wire 19', but does not respond to pulses incoming through the wire 19''). In the state considered, the circuit is still insensitive to these pulses, however, since the pulse generator 39 has not been cocked. However, if the circuit receives through the wire 10 a pulse from the information source $A_1$ at the moment $t_7$ of a pulse cycle (which means that this information source contains information intended for transmission), the pulse generator 38 is fired and hence the pulse generator 39 cocked. The circuit has thus been made sensitive to pulses incoming through the wire 19'. Let it now be assumed that the first pulse is received through the wire 19' at the moment $t_5$, which means that the information receiver $C_3$ is free. The pulse generator 39 is then fired at the moment $t_5$, so that the pulse generators 37 and 40 are cocked. The pulse generator 37 is fired at $t_8$ and then delivers a control pulse which is led through the wire 12 to the information source $A_1$ and allows it to transmit the information stored therein. The pulse generator 40 is fired at $t_6$ and delivers a pulse opening the gate 33 in coincidence and cocking the pulse generator 36 in coincidence. The gate 33 thus passes pulses at the moments $t_9$ of the pulse cycles, which pulses are led through the wire 15 to the gate $P_{13}$. The pulse generator 36 is fired at the moment $t_8$ and then delivers a control pulse which is led through the wire 08 to the information receiver $C_3$ and makes it busy. However, neither of the gates 41 and 32 could be opened, nor has one of the storing pulse generators 34 and 35 been cocked, since coincidence has not taken place at these gates and storing pulse generators. As soon as the information source $A_1$ has transmitted a complete telegram, the circuit receives through the wire 11 a pulse at the moment $t_7$ of a pulse cycle. This pulse closes the gate 33 and cocks the pulse generator 38, so that the circuit has been restored to its initial state. If necessary, the pulse generator 38 may be cocked via an inlet 45, which is required inter alia when the circuit is made operative for the first time after a disturbance. By closing the switch 53, the circuit is also made sensitive to control pulses incoming through the wire 19''.

Figure 6:
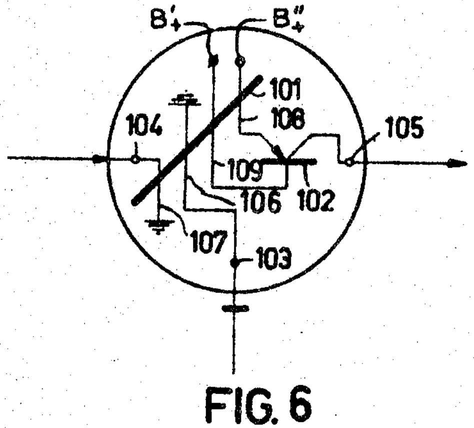
FIGURE 6 shows the circuit diagram of a pulse generator with memory.

In FIGURE 6 an embodiment of a storing pulse generator is shown inside the symbol used therefor. This figure shows a ring 101 of a material having a rectangular magnetic hystersis loop, a pnp-transistor 102, a cocking terminal 103, a firing terminal 104, an output terminal 105, a cocking winding 106 of the ring 101, connected to the cocking terminal, a firing winding 107 of the ring 101, connected to the firing terminal, a feedback winding 108 of the ring 101, which is connected to a positive voltage sourme $B'_+$ and also to the emitter of the transistor 102, and a control winding 109 which is connected to a second positive voltage source $B''_+$, which may coincide with the first-mentioned voltage source, and also to the base of the transistor 102. The collector of transistor 102 is connected to the output terminal 105. The voltage sources $B'_+$ and $B''_+$ have voltages such that the transistor is normally cut off.

The circuit arrangement operates as follows. Let it be assumed that a current pulse is led to the cocking terminal 103. The ring 101 is then brought into a magnetic state referred to as the state 1. If the ring 101 is in this state, the pulse generator is cocked. If, now, a pulse is led to the firing terminal 104, the ring 101 starts to flop back to the state 0, so that a voltage induced in the control winding 109 renders the base of the transistor 102 negative relative to its emitter. The transistor is thus conductive and the pulse generator delivers an output pulse. The current which thus traverses the feedback winding 108 enhances the action of the firing pulse and may even take it over if the firing pulse has already ended before the ring 101 has reached the state 1. By suitable proportioning it may be ensured that the output pulse has a sharply-defined duration and amplitude which are substantially independent of the kind of the firing pulse. It will otherwise be clear that the pulse generator may alternatively be provided with two or more firing terminals, connected to separate firing windings, or two or more cocking terminals connected to separate cocking windings. In addition, the assembly may be designed so that the pulse generator can be cocked only by leading a cocking pulse at the same time to two cocking terminals (cocking in coincidnece).

Figure 7:
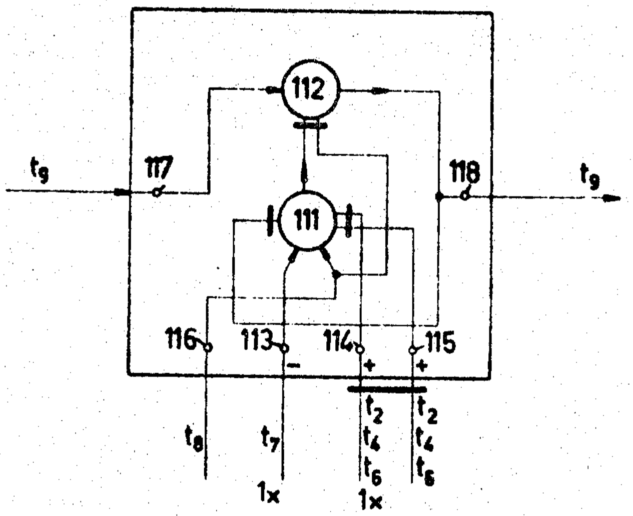
FIGURE 7 shows the circuit diagram of a pulse gate built up of two pulse generators with memories.

FIGURE 7 shows the diagram of a gate which can be used in the control circuits $F_1$ and $F_2$. Such a gate comprises two storing pulse generators 111 and 112, two control terminals 113 and 114, two supply terminals 115 and 116, an input terminal 117 and an output terminal 118. The supply terminal 115 receives pulses at the moment $t_2$ (gate 31 of FIGURE 5), at the moment $t_4$ (gate 32 of FIGURE 5), or at the moment $t_6$ (gate 23 of FIGURE 5) of each pulse cycle. The supply terminal 116 receives pulses at the moment $t_8$ of each pulse cycle. The arrangement can be seen from FIGURE 7. This gate operates as follows. Let it be assumed that a pulse is led once to the control terminal 114 at one of the moments $t_2$, $t_4$ and $t_6$. This pulse then coincides with one of the pulses led to the control terminal 115 so that the pulse generator 111 is cocked. The pulse generator 111 is fired at the next moment $t_8$ by a pulse led to the supply terminal 116, this pulse cocking the pulse generator 112 in coincidence with the output pulse delivered by the pulse generator 111. The pulse generator 112 is fired at $t_9$ and the resulting output pulse is the output pulse of the gate as a whole and is also used for cocking again the pulse generator 111. The pulse generator 111 is then fired again at $t_8$ and the resulting output pulse again cocks the pulse generator 112 in coincidence with the firing pulse. This cycle of events is repeated continuously, in other words, the gate is opened and delivers output pulses at the moment $t_9$ of each pulse cycle. However, if a pulse is led once to the control terminal 113 at the moment $t_7$, the pulse generator 111 is fired, but this does not result in cocking of the pulse generator 112 due to the absence of coincidence. Firing of the pulse generator 111 at the moment $t_8$ of each pulse cycle now also fails to produce any effect since the pulse generator 111 is no longer cocked.

Summarizing the above, a chronology of events may simply be stated as follows:

In a prior cycle, a $t_7$-line 10 pulse, indicating the presence of a message to be transmitted, has been propagated to the control circuit $F_1$ (FIG. 5). Previous to this propagation, an end of message pulse (from a prior message) has appeared in a former cycle at $t_7$ to cock the gate 38. The new pulse appearing at $t_7$-line 10 then fires the gate 38 and cocks the gate 39. The control unit is now prepared to effect the switching cycle operation. For this example, it is assumed that $C_1$ is busy, while $C_2$ and $C_3$ are free. It is noted that receiver unit $C_1$ is sampled at $t_1$; $C_2$ at $t_3$; and $C_3$ at $t_5$.

$t_1$: Receiver $C_1$ is busy. This means the gate 75 (FIG. 4) is open and will not pass the $t_1$ pulse. Accordingly, nothing can happen in terms of pulse output from $C_1$.

$t_2$: The $t_2$ pulse is applied to the cocking terminals of gate 34 and generator 31, located in the control unit $F_1$ (FIG. 5). Since both of these units require coincident cocking, and neither have a set of coincident pulses applied thereto, neither are cocked.

$t_3$: Receiver $C_2$ is not busy. Gate 75 (FIG. 4) is therefore closed and a series of pulses will be emergent from the gates 70–73. Note that the gate 70 is initially cocked. See page 11, at the bottom, of the specification. These pulses enter the control unit $F_1$ (FIG. 5) at terminal 43, and fire the gate 39 which, as set forth above, had previously been cocked. The gate 40 is cocked by the resultant output of gate 39, as is the gate 37.

$t_4$: The $t_4$ pulse fires the gate 40 and simultaneously applies a pulse to the coincident cocking terminals of generator 32 and gate 35. The output of the gate 40 is simultaneously applied to the other coincident terminal of the generator 32 and gate 35. The coincident application of pulses cocks each of the units 32 and 35.

$t_5$: Receiver $C_3$ is not busy and a pulse series similar to that from $C_2$ will emerge from $C_3$. However, when entering the control unit, the pulses will not be registered because the gate 39 has already been fired ($t_3$) and not re-cocked.

$t_6$: Since the $t_5$ pulses have not been registered, the $t_6$ pulses applied to the gates 40 and 36, and the generator 33 will have no effect: Gate 40 has not been re-cocked, and no coincident pulses are applied along with $t_6$ at units 33 and 36.

$t_7$: A $t_7$-10 (FIG. 5) pulse will have no effect at this time because gate 38 has already been fired and not re-cocked.

$t_8$: The $t_8$ pulse, applied to the gates of the control unit $F_1$, will fire only the gate previously cocked: gate 35. The resultant pulse emerges from $F_1$ at terminal 5D and is transmitted over line 07 to the receiver $C_2$ where it enters at terminal 67 (FIG. 4) and cocks the gate 74 therein.

$t_9$: The $t_9$ pulse fires only the unit previously cocked: storing generator 32. The resultant pulse appears at terminal 47 (FIG. 5) and emerges on line 14 to the gating unit $P_{12}$ (FIG. 1 or 2) whereupon that gate is closed and information from unit $A_1$ will now be channeled through the gate $P_{12}$ to the receiver $C_2$. At the same time, a $t_9$ pulse is similarly applied to gate 74 of control unit $C_2$ (FIG. 4), thereby causing it to fire and apply a pulse to gate 75, opening same and providing thereafter that the unit $C_2$ is busy.

$t_{10}$: FIG. 4) fires gates 76 and 77. In the embodiment shown, a priority system may be set up by utilizing a bistable ring, having a particular firing pattern, in conjunction with a further set of gates 76 and 77. When these are used, the $t_1$ pulses will indicate, by means of firing gates 78 or 79, the desired priority or switching sequence.

Other modifications of switching, such as the embodiment of FIG. 2 wherein further controls may be provided, are fully detailed in the specification.

It is noted that the above chronology is set forth in the above specification in far greater detail than is here presented. The steps set out above are merely a summary statement of concepts that are fully disclosed.

The various circuits are shown as parallel circuits for the sake of simplicity, but are actually series-circuits, because a current technique instead of a voltage technique is used here. However, this has evidently no relationship to the inventive idea described hereinbefore.

What is claimed is:

1. A signal transmission system comprising a plurality of sources of information signals, a plurality of information receivers, and means for selectively connecting each of said sources to each of said receivers, each of said sources of information signals comprising means providing a first output control signal responsive to the presence of information signals in the respective source, means providing a second output control signal responsive to the completion of transmission of information signals from the respective source, an information signal output terminal, and means responsive to an input control signal for initiating the transfer of information signals in the respective source to the respective information signal output terminal, each of said information receivers comprising N output terminal means, where N is the number of said sources, control signal input means, and information signal input means, said information receivers comprising means for applying pulse trains to the respective output terminals, the pulses of the pulse trains of the different information receivers occurring at different instants, and means responsive to control signals applied to the respective control signal input means for stopping the pulse train of the respective information receiver, said means for selectively connecting said sources to said receivers comprising a switching matrix having a plurality of switching devices each having a matrix input terminal, a matrix output terminal, and a matrix control terminal responsive to signals applied thereto for providing a signal conducting path between the respective matrix input terminal and matrix output terminal, means connecting said matrix input terminals to separate information signal output terminals, means connecting said matrix output terminals to separate information signal input means, a control circuit for each of said sources, each of said control circuits comprising first, second and third control circuit input terminals, means applying said first and second output control signals to said first and second terminals respectively of the respective source, means connecting a separate output terminal of each of said information receivers to the third control circuit input of each of said control circuits, separate matrix control output terminal means connected to each of the matrix control terminals of the switching devices to which the respective source is connected, separate information receiver control output terminals connected to the control signal input terminal means of each information receiver, means for providing an input connected signal, and means for applying said input control signal to the respective source, each of said control circuits comprising means responsive to said first output control signal for rendering the respective control circuit sensitive to pulse trains received from said information receivers, means for applying a signal to the matrix control output terminal means corresponding to the information receiver from which the first pulse is received, means for applying a signal to the information receiver control output terminal means for stopping the pulse train output of the information receiver from which the first pulse is received, and means for applying said input control signal to the respective source, said control circuits comprising means responsive to said second output control signal for stopping said signal applied to the matrix control output terminal means.

2. A signal transmission system comprising N sources of information signals, M information receivers, where M and N are integers, $M \times N$ switching devices for separately connecting each source to each information receiver, and a control circuit corresponding to each source for controlling the switching devices connected to the respective source, said sources each comprising means for providing a first pulse train of pulses occurring at first instants of pulse cycles when the respective source contains information signals to be transmitted, means for providing a first pulse at a first instant following the completion of transfer of information signals from the respective source, means applying said first pulse train and first pulse to the corresponding control circuit, and means responsive to a second pulse at a second instant of said pulse cycles for permitting said information signals to be applied to said switching devices at third instants of said pulse cycles, said switching means each comprising an input terminal connected to receive information signals from a source, an output terminal connected to apply information signals to an information receiver, and control means for permitting transfer of information signals between the respective input and output terminal during the time a pulse is applied to the control means of the respective device, each of said information receivers comprising means for providing a second pulse train of pulses occurring at instants of said pulse cycles other than said first, second and third instants when the respective information receiver is free to receive information signals, the pulses of the second pulse trains of the different information receivers occurring at different predetermined instants of said pulse cycles, control means for stopping the second pulse train of the respective information receiver when a pulse is applied to the respective control means, and means for applying at least a portion of said second pulse train to each of said control circuits, each of said control circuits comprising means responsive to said first pulse train of the respective source for rendering the respective control circuit sensitive to the second pulse trains received from said information receivers, means responsive to the first of said second trains received after becoming sensitive for providing said second pulse and applying said second pulse to the respective information source, for providing a third pulse at said second pulse instant and for applying said third pulse to the control means of the information receiver which generated the first of said second pulse trains received, for providing a third pulse train of pulses at said third instants and applying said third pulse train to the control means of the switching device connected to the respective source and to the information receiver which generated the first of said second pulse trains received, and for rendering the respective control circuit insensitive to other second pulse trains, said control circuits being further responsive to said first pulse from the respective source for stopping said third pulse train.

3. The system of claim 2, in which said control circuits comprise means responsive to said first pulse train for rendering the respective control circuit insensitive to later occurring pulses of said first pulse train, and means responsive to said first pulse for rendering the respective control circuit sensitive to said first pulse train from the respective source.

4. The system of claim 3, in which said control circuits comprise first and second storage pulse generators each having a cocking terminal, a firing terminal, and an output terminal, means applying said first pulse train to the firing terminal of said first pulse generator, means applying said first pulse to the cocking terminal of said first pulse generator, means connecting the output terminal of said first pulse generator to the cocking terminal of said second pulse generator, means applying said second pulse train to the firing terminal of said second pulse generator, and first, second and third means connected to the output terminal of said second pulse generator for generating said second and third pulses and said third pulse series respectively.

5. The system of claim 4, in which said first means comprises a plurality of a plurality of gate circuits each having first and second opening terminals for opening the respective gate by coincidence, closing terminal means, and input and output terminals, a source of a pulse train of pulses at said third instant connected to the input terminals of said gate circuits, means applying said first pulse to said closing terminal means, third storage pulse generator means having a cocking terminal, a firing terminal, and an output terminal, means connecting the output terminal of said second pulse generator to the cocking terminal of said third pulse generator, a source of a plurality of pulse trains of pulses occurring at instants between the instants of the pulses of said second pulse trains, means connecting said source of a plurality of pulse trains to the firing terminal of said third pulse generator, means connecting the output terminal of said third pulse generator to said first opening terminals, means applying separate pulse trains of said plurality of pulse trains to said second opening terminals, and means for obtaining said third pulse trains from the output terminals of said gate circuits.

6. The system of claim 4, in which said second means comprises third storing pulse generator means having a cocking terminal, a firing terminal and an output terminal, means connecting the output terminal of said second pulse generator to the cocking terminal of said third pulse generator, a source of a plurality of pulse trains of pulses occurring at instants between the instants of pulses of said second pulse trains, means connecting said source of a plurality of pulse trains to the firing terminal of said third pulse generator, a plurality of further pulse generators each having a firing terminal, an output terminal and first and second cocking terminals for cocking said further pulse generators by coincidence, means connecting the output terminal of said third pulse generator to said first cocking terminals, means applying separate pulse trains of said plurality of pulse trains to said second cocking terminals, means connected to the firing terminals of said further pulse generators for firing them at said second instants, and means for obtaining said third pulses from the output terminals of said further pulse generators.

7. The system of claim 2, in which said means for applying at least a portion of said second pulse train to each of said control circuits comprises means for applying a greater proportion of said second pulse train to one control circuit than to another control circuit.

8. The system of claim 2, in which said information receivers each comprise circulating shift register means for generating said second pulse trains, means responsive to said third pulse for stopping said shift register means, and means for starting said shift register means when the respective information receiver is free to receive information from said switching devices.

References Cited by the Examiner

UNITED STATES PATENTS 1,927,556 9/1933 Nelson.

NEIL C. READ, *Primary Examiner.*

P. XIARHOS, *Assistant Examiner.*